Aug. 6, 1957     C. H. FRY     2,801,897
MEANS FOR FORMING A HOLLOW CONTRACTILE RING
Filed Aug. 18, 1955

INVENTOR,
CHARLES H. FRY
BY Terry & Cohn
ATTORNEYS

United States Patent Office 2,801,897
Patented Aug. 6, 1957

2,801,897
MEANS FOR FORMING A HOLLOW CONTRACTILE RING

Charles H. Fry, Kansas City, Mo.

Application August 18, 1955, Serial No. 529,123

10 Claims. (Cl. 18—41)

This invention relates to an improved means and method for forming a hollow contractile ring.

It is an important object of the present improvements to realize a dipping die mold that is particularly adapted to assist in the formation of a hollow torroidal ring. These contractile hollow rings may be used for toys, tires, tubes, tourniquets, devices for aiding copulation, circumcision rings and for many medical devices. Briefly, such a die mold includes a torroidal body portion closed upon itself to provide a circular center aperture, and includes a continuous peripheral groove in the outermost margin of the body portion which is adapted to cooperate with a separating element located in the groove to afford mating sealing flanges. Other advantages are realized by this structural arrangement in that the separating element may be conveniently utilized to remove the molded item from the die mold.

Another important objective is realized by the provision of a peripheral groove in the torroidal body portion of the die mold and of a separating element retained in the groove and extending outwardly of the body portion, the groove and separating element forming separate yet mating sealing flanges that will be located internally of the hollow body portion of the contractile ring.

Still another important objective is achieved by the provision of a die mold having a novel structural arrangement of component parts which is simple and durable in construction and inexpensive to manufacture and assemble.

Yet another important object is realized by the novel method of forming a hollow contractile ring of resilient material such as latex, the method being particularly adapted to form such rings easily and economically.

The foregoing and numerous other objects and advantages of the invention will more clearly appear from the following detailed description of a preferred embodiment of the dipping die mold and the method for forming a contractile ring, particularly when considered in connection with the accompanying drawing, in which.

Figure 1:
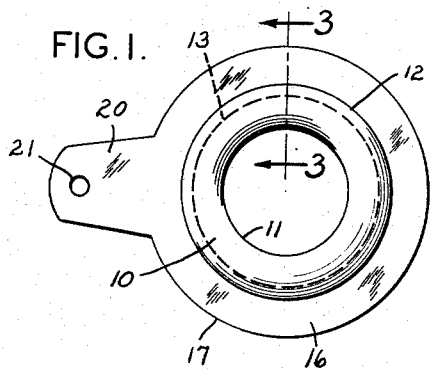
Fig. 1 is a side elevational view of the dipping die mold.
Figure 2:
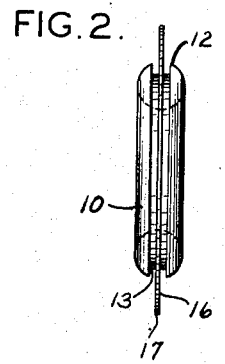
Fig. 2 is an end elevational view of the die mold shown in Fig. 1.
Figure 3:
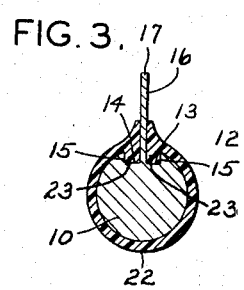
Fig. 3 is a view in cross section as seen along line 3—3 of Fig. 1.

Referring now by characters of reference to the drawing, and first to Figs. 1, 2 and 3, it is seen that the dipping die mold includes a torroidal body portion 10 closed upon itself to provide a circular center aperture 11. The body portion 10 is substantially circular in cross section as is shown in Fig. 3 except for a peripheral formation which will be described fully.

Formed in the outermost peripheral margin 12 of torroidal body portion 10, is a continuous peripheral groove 13 defined by bottom wall 14 and side walls 15. The side walls 15 may be slightly tapered to facilitate removal of the formed article from the mold.

A thin separating element 16 is carried by torroidal body portion 10 and is located medially of continuous groove 13 as is best shown in Figs. 2 and 3. The separating element 16 extends radially outwardly of body portion 10 for a considerable distance beyond the peripheral margin 12. The separating element 16 includes a circular peripheral margin or cutting edge 17. A handle 20 is provided on separating element 16 and extends outwardly in the same plane. The handle 20 is provided with a hole 21 and is adapted to be attached to some holding means (not shown) adapted to hold the die mold incident to dipping operation.

In utilizing the die mold for forming a hollow, torroidal contractile ring, the die mold is held by handle 20 and dipped into latex or some other like material to form a resilient layer 22 on body portion 10. As is more clearly shown in Fig. 3, the latex forms circular layer 22 on body portion 10, and flows into the groove 13 on each side of separating element 16, and flows on and adheres to the separating element 16 for a considerable distance outwardly of the body portion 10 of the die mold. The latex that flows into groove 13 forms a pair of mating flanges 23, the purpose of which will more clearly appear from the later description.

If the separating element 16 is completely covered by a layer of latex, the circular cutting edge 17 is used to slit the latex covering. Then the latex item is removed from the die mold. If the side walls 15 of continuous groove 13 are slightly tapered, the sealing flanges 23 may be easily removed without any tearing or mutilation.

Figure 4:
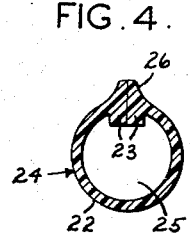
Fig. 4 is a cross sectional view of the article after it is removed from the die mold and sealed along the flanges.

When removed from the die mold the contractile ring, generally indicated at 24 in Fig. 4, normally assumes the position shown to provide a hollow interior chamber 25. As is shown in Fig. 4, the sealing flanges 23 and the excess material formed on separating element 16 are placed in contiguous abutment since they have smooth matching surfaces, and are vulcanized together. It will be particularly noted that the flanges 23 extend for a considerable distance into the hollow chamber 25 of the body portion of the contractile ring 24.

Figure 5:
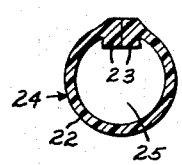
Fig. 5 is a cross sectional view of the article shown in Fig. 4 with the excess material trimmed off.
Figure 7:
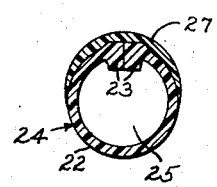
Fig. 7 is a view in cross section of the contractile ring as taken along line 7—7 of Fig. 6.
Figure 6:
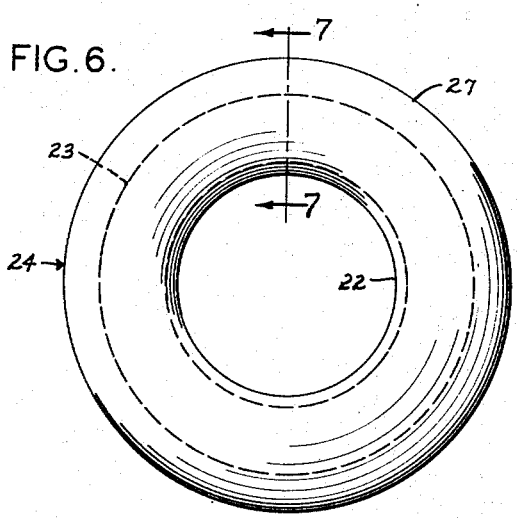
Fig. 6 is an enlarged side elevational view of the contractile ring.

From Fig. 5 is is seen that the next step toward forming the completed contractile ring consists of trimming the excess material shown by 26 in Fig. 4 down substantially even with the circular layer 22. Then the contractile ring 24 is revolved in latex to form an outermost layer 27 on the outermost peripheral margin of the ring and over the sealing flanges 23. In the preferred construction, the outermost layer 27 blends evenly and smoothly into the surface of circular layer 22 of the contractile ring. Thus it is seen that the contractile ring has the appearance of a seamless hollow torroidal body.

These contractile hollow rings 24 are resilient in character so as to permit the center aperture 11 to be enlarged when the ring is stretched, and the walls constituting the ring are compressible due to the hollow chamber 25, thus adapting the ring for many uses, as for example, for tires, toys, tubes, tourniquets, devices for aiding copulation, circumcision rings and for many medical devices.

Although the invention has been described by making detailed reference to a single preferred embodiment of a die mold, and to a method for making a contractile ring, such detail is to be understood in an instructive, rather than in any restrictive sense, many variants being possible within the scope of the claims hereunto appended.

I claim as my invention:

1. A dipping die mold for making tubular rings, comprising a torroidal body portion, the body portion including a peripheral margin, said margin being provided with a peripheral groove, and separating means carried by said body portion in said groove.

2. A dipping die mold for making tubular rings, comprising a torroidal body portion, said body portion providing a center aperture, said body portion being substantially circular in cross section, the body portion including a peripheral margin, said margin being provided with a peripheral groove, and separating means carried by said body portion in said groove.

3. A dipping die mold for making tubular rings comprising a torroidal body portion, the body portion including a peripheral margin, said margin being provided with a peripheral groove, a thin separating element carried by said body portion in said groove, said separating element extending radially outwardly of said groove, and handle means on said separating element for holding said die mold.

4. A dipping die mold for making tubular rings comprising a torroidal body portion, said body portion providing a center aperture, said body portion being substantially circular in cross section, the body portion including a peripheral margin, said margin being provided with a peripheral groove, and separating means carried by said body portion in the center of said groove, the separating means extending outwardly of the peripheral margin of said body portion.

5. A dipping die mold for making tubular rings comprising a torroidal body portion, the body portion including a peripheral margin, said margin being provided with a peripheral groove, a circular separating element located in said groove, and extending outwardly of said peripheral margin, and means on said element to permit the mold to be dipped.

6. A dipping die mold for making tubular rings comprising a torroidal body portion, said body portion providing a center aperture, said body portion being substantially circular in cross section, the body portion including an outermost peripheral margin, said margin being provided with a continuous peripheral groove, a thin separating element carried by said body portion in said groove, and handle means on said separating element for holding the die mold incident to dipping.

7. A dipping die mold for making tubular rings comprising a torroidal body portion, said body portion being closed upon itself to provide a circular center aperture, said body portion being substantially circular in cross section, the body portion including a peripheral margin, said margin being provided with a continuous peripheral groove, a thin circular separating element carried by said body portion in said groove, said separating element extending radially outwardly of said groove and peripheral margin, and handle means on said separating element for holding said die mold incident to dipping operation.

8. A dipping die mold comprising a body portion closed upon itself to provide a center aperture, said body portion having an outer margin, said body portion being provided with a groove about said outer margin, and separating means carried by said body portion and located in said groove.

9. A dipping die mold comprising a body portion closed upon itself to provide a continuous aperture, said body portion having an outer margin, said body portion being provided with a continuous groove extending entirely about said outer margin, a thin separating element carried by said body portion, said separating element being located in said groove, said separating element extending entirely about said body portion and extending radially outwardly of said groove and body portion, and handle means on said separating element for holding the die mold incident to dipping operation.

10. A dipping die mold for making tubular rings comprising a torroidal body portion, the body portion being closed upon itself to provide a circular center aperture, said body portion being substantially circular in cross section, the body portion having an outermost peripheral margin, said peripheral margin being provided with a continuous peripheral groove extending entirely about said body portion, a thin circular separating element carried by said body portion in said groove, said separating element extending entirely about said body portion and extending radially outwardly of said groove and said body portion, and handle means on said separating element for holding said die mold incident to dipping operation.

References Cited in the file of this patent

UNITED STATES PATENTS

| | | |
|---|---|---|
| 2,539,513 | Jenett | Jan. 30, 1951 |
| 2,566,025 | Hauser | Aug. 28, 1951 |